(12) United States Patent
Murphy et al.

(10) Patent No.: US 6,680,825 B1
(45) Date of Patent: Jan. 20, 2004

(54) IN-PLANE SUSPENSION-LEVEL BENDING MICROACTUATOR FOR PRECISE HEAD POSITIONING

(75) Inventors: James Morgan Murphy, Boulder, CO (US); Richard August Budde, Plymouth, MN (US); Markus E. Mangold, Eden Prairie, MN (US); Peter Crane, Richfield, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/553,523

(22) Filed: Apr. 20, 2000

Related U.S. Application Data

(60) Provisional application No. 60/161,692, filed on Oct. 26, 1999.

(51) Int. Cl.⁷ .............................. G11B 21/24; G11B 5/56
(52) U.S. Cl. ..................................................... 360/294.4
(58) Field of Search .......................... 360/294.4, 294.3, 360/294.2, 294.1, 294.6; 310/328, 323.17, 67 R, 51, 22, 36

(56) References Cited

U.S. PATENT DOCUMENTS

| | | | |
|---|---|---|---|
| 5,521,778 A | 5/1996 | Boutaghou et al. ......... | 360/106 |
| 5,764,444 A | 6/1998 | Imamura et al. ............. | 360/109 |
| 5,786,964 A * | 7/1998 | Sone et al. ............... | 360/234.5 |
| 5,898,544 A | 4/1999 | Krinke et al. ................ | 360/104 |
| 6,046,888 A * | 4/2000 | Krinke et al. ............. | 360/294.4 |
| 6,108,175 A * | 8/2000 | Hawwa et al. ............ | 360/294.4 |
| 6,188,548 B1 * | 2/2001 | Khan et al. ............... | 360/294.4 |
| 6,215,629 B1 * | 4/2001 | Kant et al. ................... | 360/290 |
| 6,268,983 B1 * | 7/2001 | Imada et al. .............. | 360/294.3 |
| 6,278,587 B1 * | 8/2001 | Mei ......................... | 360/294.6 |
| 6,310,750 B1 * | 10/2001 | Hawwa et al. ............ | 360/294.6 |
| 6,327,120 B1 * | 12/2001 | Koganezawa et al. ... | 360/294.4 |
| 6,331,923 B1 * | 12/2001 | Mei ......................... | 360/294.4 |
| 6,335,848 B1 * | 1/2002 | Mei ......................... | 360/294.4 |
| 6,369,986 B1 * | 4/2002 | Coon ...................... | 360/244.9 |

* cited by examiner

*Primary Examiner*—William Korzuch
*Assistant Examiner*—Angel Castro
(74) *Attorney, Agent, or Firm*—Kinney & Lange, P.A.

(57) ABSTRACT

A microactuation system selectively alters a position of a transducing head carried by a slider in a disc drive system with respect to a track of a rotatable disk having a plurality of concentric tracks. The microactuation system includes a head suspension having a first portion and a second portion coupled by one or more flexible hinges. An electroactive element is attached to the first portion of the head suspension at one end and the second portion of the load beam at the other end. The electroactive element bends in response to a control signal applied thereto. The hinge is sufficiently compliant to permit movement of the first portion with respect to the second portion of the head suspension.

18 Claims, 5 Drawing Sheets

IN-PLANE SUSPENSION-LEVEL BENDING MICROACTUATOR FOR PRECISE HEAD POSITIONING

CROSS-REFERENCE TO RELATED APPLICATION(S)

This application claims priority from provisional application No. 60/161,692, filed Oct. 26, 1999 for "PIEZOELECTRIC IN-PLANE BIMORPH ON LOAD BEAM SUSPENSION-LEVEL MICROACTUATOR" by James Morgan Murphy, Richard August Budde, Markus E. Mangold, and Peter Crane.

BACKGROUND OF THE INVENTION

The present invention relates to a suspension-level microactuator having an improved stroke length. More particularly, it relates to a microactuator located in-plane along a suspension in a disc drive system and having an electroactive element to selectively move a transducing head radially with respect to a rotatable disc.

Disc drive systems include disc drive suspensions for supporting transducing heads over information tracks of a rotatable disc. Typically, suspensions include a load beam having a mounting region on a proximal end, a flexure on a distal end, a relatively rigid region adjacent to the flexure, and a spring region between the mounting region and the rigid region. An air bearing slider which supports the transducing head is mounted to the flexure. The mounting region is typically attached to a base plate for mounting the load beam to an actuator arm. A motor which is controlled by a servo control system rotates the actuator arm to position the transducing head over the desired information tracks on the disc. This type of suspension is used with both magnetic and non-magnetic discs.

In an effort to increase the storage capacity of hard disc drives, the density of concentric data tracks on magnetic discs continues to increase (i.e., the size of data tracks and radial spacing between the data tracks continues to decrease). Therefore, a corresponding improvement in the accuracy of the positioning system that locates the transducing head over a particular track is needed. Conventionally, the positioning system uses a single-stage, closed-loop feedback system in which a large-scale actuation motor, such as a voice coil motor, acts in response to a control signal based on position error information from the read head to radially position a head on a slider at the end of the actuator arm. This system is approaching the limit of its ability to follow the ever-narrower tracks and to reject the vibrations and disturbances present in the drive environment. This inability to follow the narrow tracks is due in large part to the significant length of structure between the voice coil motor and the head and the in-loop resonances which result from the structure. Thus, a high resolution head positioning mechanism is needed to accommodate the more densely spaced tracks.

One promising design for high resolution head positioning involves employing a high resolution microactuator in addition to the conventional low resolution actuator motor, thereby effecting head positioning through dual-stage actuation. Various microactuator designs have been considered to accomplish high resolution head positioning. These designs, however, have shortcomings that limited the effectiveness of the microactuator. Many designs increased the complexity of designing and assembling the existing components of the disc drive, while other designs were unable to achieve the force and bandwidth necessary to accommodate rapid track access. Therefore, the prior designs did not present ideal microactuator solutions.

The positioning of a transducing head through dual-stage actuation using electroactive elements has been disclosed in prior patent applications. One such application is U.S. patent application Ser. No. 09/311,086, filed May 13, 1999 by Budde et al. entitled "PIEZOELECTRIC MICROACTUATOR SUSPENSION ASSEMBLY WITH IMPROVED STROKE LENGTH," which is assigned to Seagate Technology, Inc., the assignee of the present invention, and is hereby incorporated by reference. Another such application is U.S. patent application Ser. No. 09/553,220, filed on even date herewith by Boutaghou, Crane, Mangold, and Walter entitled "BENDING MICROACTUATOR HAVING A TWO-PIECE SUSPENSION DESIGN," which is assigned to Seagate Technology, Inc., the assignee of the present invention, and is hereby incorporated by reference. There remains a need in the art, however, for an electroactive element microactuator design that provides efficient high resolution head positioning in a dual-stage actuation system, allows for a greater range of motion than current designs, has reduced in-loop resonances, and is easy to manufacture and install.

BRIEF SUMMARY OF THE INVENTION

The present invention is a microactuator for selectively altering a position of a transducing head carried by a slider, in a disc drive system, with respect to a track of a rotatable disc having a plurality of concentric tracks. The disk drive system includes an actuator arm. The microactuator includes a load beam attached to a distal end of the actuator arm. The load beam has a first section and a second section. A flexure is connected to the second section of the load beams for supporting the slider carrying the transducing head. A hinge is attached between the first section and the second section, the hinge being flexible to permit movement of the second section with respect to the first section in the general plane of the load beam. A bending motor is connected between the first section and the second section of the load beam along a longitudinal centerline of the load beam. The bending motor is deformable in response to a control signal.

DETAILED DESCRIPTION

Figure 1:
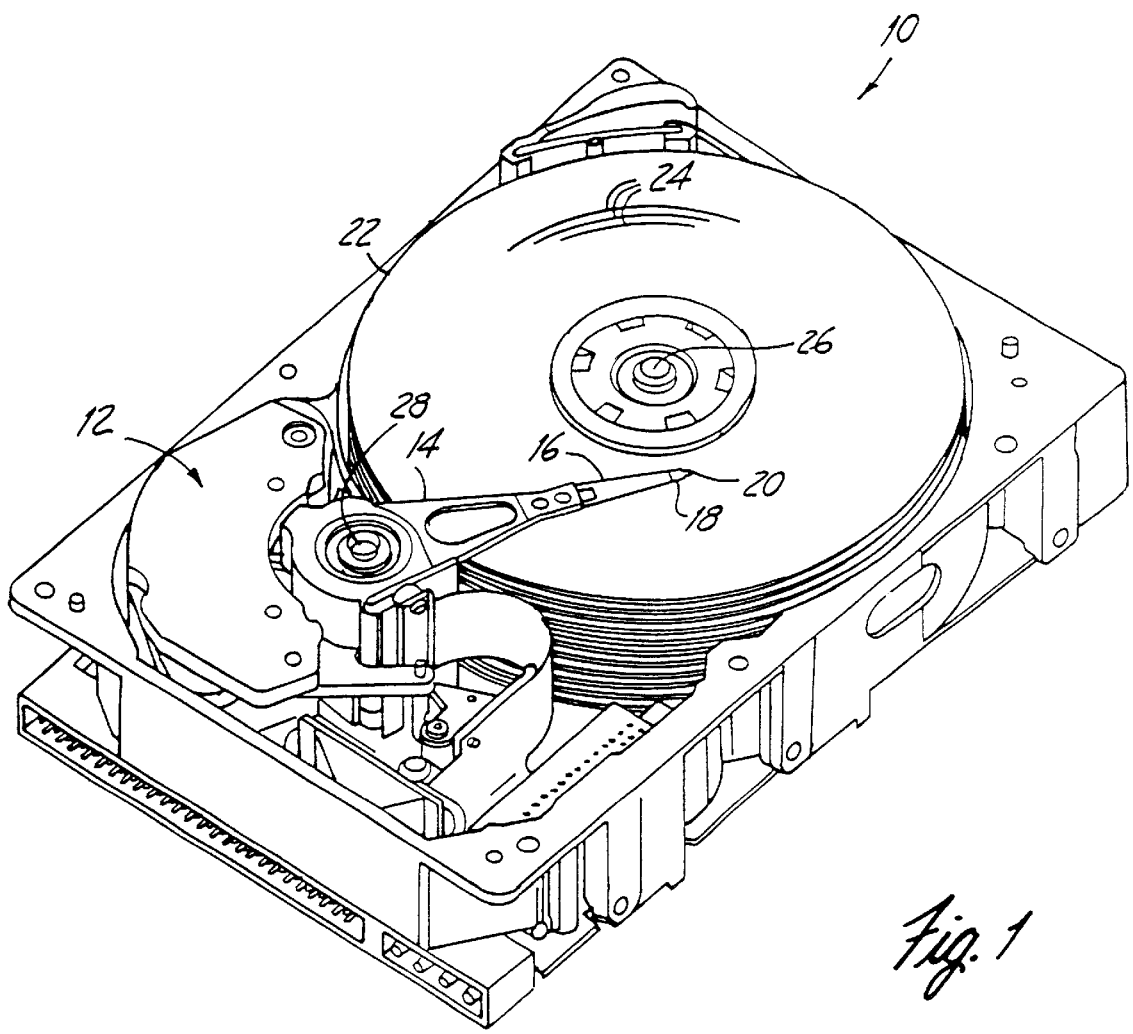
FIG. 1 is a perspective view of a disc drive system including a microactuation system for positioning a transducing head over selected tracks of a rotating disc.

FIG. 1 shows a perspective view of disc drive system 10, as known in the prior art, for positioning a transducing head (not shown) over a selected track of a magnetic disc. The system 10 includes, as shown generally from left to right in FIG. 1, a voice coil motor (VCM) 12, an actuator arm 14, a suspension 16, a flexure 18, and a slider 20. The slider 20 is connected to the distal end of the suspension 16 by the flexure 18. The suspension 16 is connected to the actuator arm 14 which is coupled to the VCM 12. As shown on the right side of FIG. 1, the system 10 includes a disc 22 having a multiplicity of tracks 24 that rotate about an axis 26. During operation of the disc drive system 10, the rotation of the disc 22 generates air movement which is encountered by the slider 20. This air movement or windage acts to keep the slider 20 aloft a small distance above the surface of the disc 22 allowing the slider to "fly" above the surface of the disc 22. Any wear associated with physical contact between the slider 20 and the disc 22 is thus minimized.

The flexure 18 provides a spring connection between the slider 20 and the suspension 16. The flexure 18 is configured such that it allows the slider 20 to move in pitch and roll directions to compensate for fluctuations in the spinning surface of the disc 22. Many different types of flexures 18, also known as gimbals, are known to provide the spring connection allowing for pitch and roll movement of the slider 20 and can be used with the present invention. The VCM 12 is selectively operated to move the actuator arm 14 around an axis 28, thereby moving the suspension 16 and positioning the transducing head (not shown) carried by the slider 20 between tracks 24 of the disc 22. Proper positioning of the transducing head (not shown) is necessary for reading and writing of data on the concentric tracks 24 of the disc 22. For a disc 22 having a high track density, however, the VCM 12 lacks sufficient resolution and frequency response to accurately position the transducing head (not shown) on the slider 20 over a selected track 24 of the disc 22. Therefore, a higher resolution actuation device is used in combination with the VCM 12.

Figure 2A:
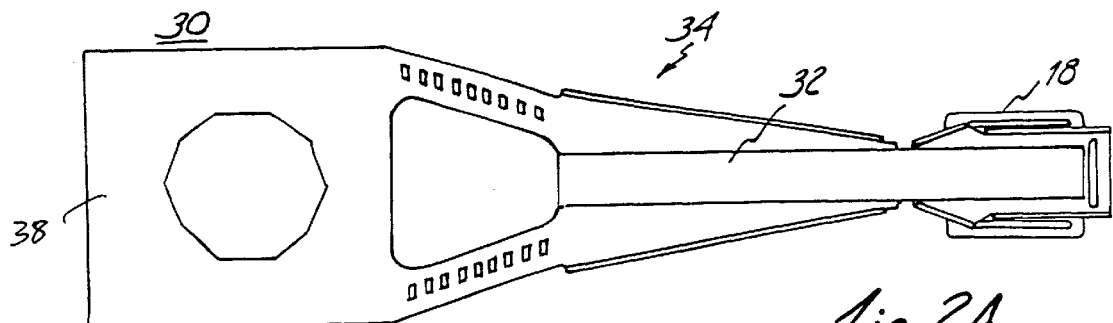
FIG. 2A is a top view of a microactuation system, shown in a neutral position, for use in a dual-stage disc drive actuation system for high resolution positioning of a transducing head according to the present invention.
Figure 2B:
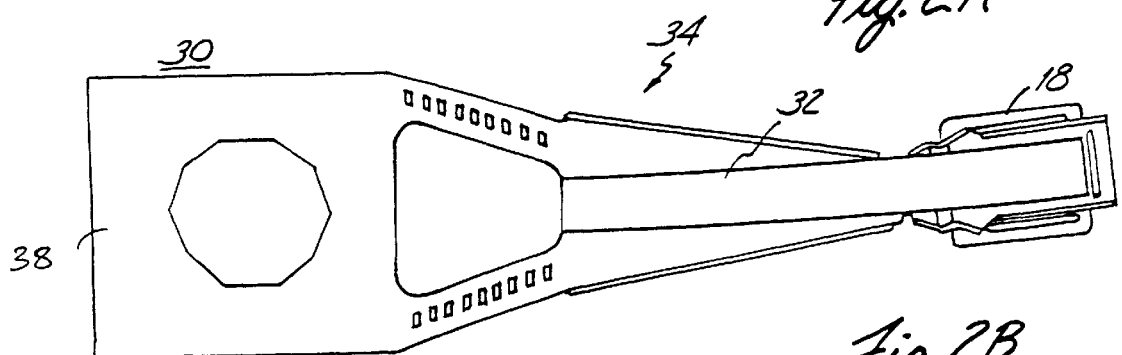
FIG. 2B is a top view of the microactuation system of FIG. 2A, shown in a first actuated position, for use in a dual-stage disc drive actuation system for high resolution positioning of a transducing head according to the present invention.
Figure 2C:
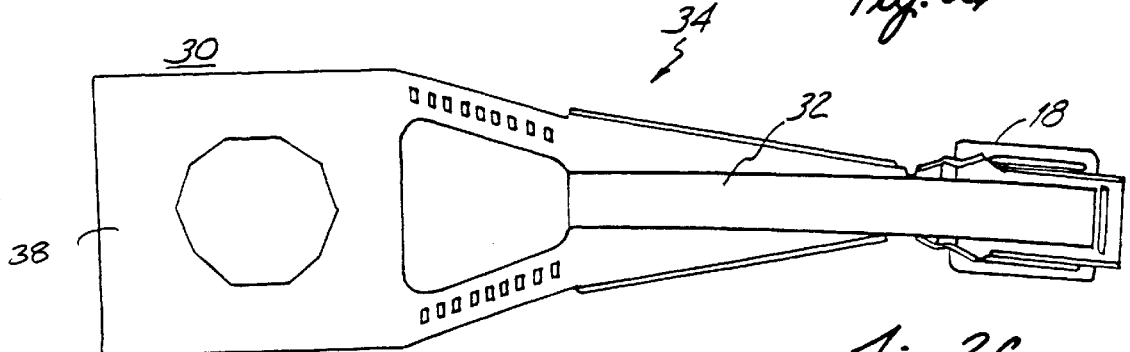
FIG. 2C is a top view of the microactuation system of FIG. 2A, shown in a second actuated position, for use in a dual-stage disc drive actuation system for high resolution positioning of a transducing head according to the present invention.

FIGS. 2A–2C show three top views of a microactuation system 30 for use in a dual stage disc drive actuation system for high resolution positioning of a transducing head (not shown) according to the present invention. As shown from right to left in FIGS. 2A–2C, the microactuation system 30 includes a bending motor 32 and a load beam 34. A mounting region 38 of the load beam 34 connects to a base plate (not shown) which connects to the actuator arm 14. The bending motor 32, the load beam 34, and the base plate are all components of the suspension 16 (as shown in FIG. 1). As shown on the far right side in FIGS. 2A–2C, the distal end of the load beam 34 is coupled to the flexure 18, which holds the slider 20.

FIGS. 2A–2C when viewed together illustrate the general operation of the microactuation system 30 of the present invention. FIG. 2A shows the microactuation system 30 in a neutral position. As is apparent from FIG. 2A, in the neutral position the bending motor 32 is generally straight along its longitudinal axis. FIG. 2B shows the microactuation system 30 in a first actuated position in which the bending motor 32 is curved or bent to the left of the neutral position. FIG. 2C shown the microactuation system 30 in a second actuated position in which the bending motor 32 is curved or bent to the right of the neutral position. The amount of displacement of the slider 20 shown in FIG. 2B and FIG. 2C is exaggerated for purposes of illustration. The bending of the bending motor 32 operates to cause a displacement of the slider 20 and thus the transducing head (not shown), which in turn causes an adjustment of the position of the transducing head (not shown) with respect to a selected track 24 of the disc 22.

Figure 3:
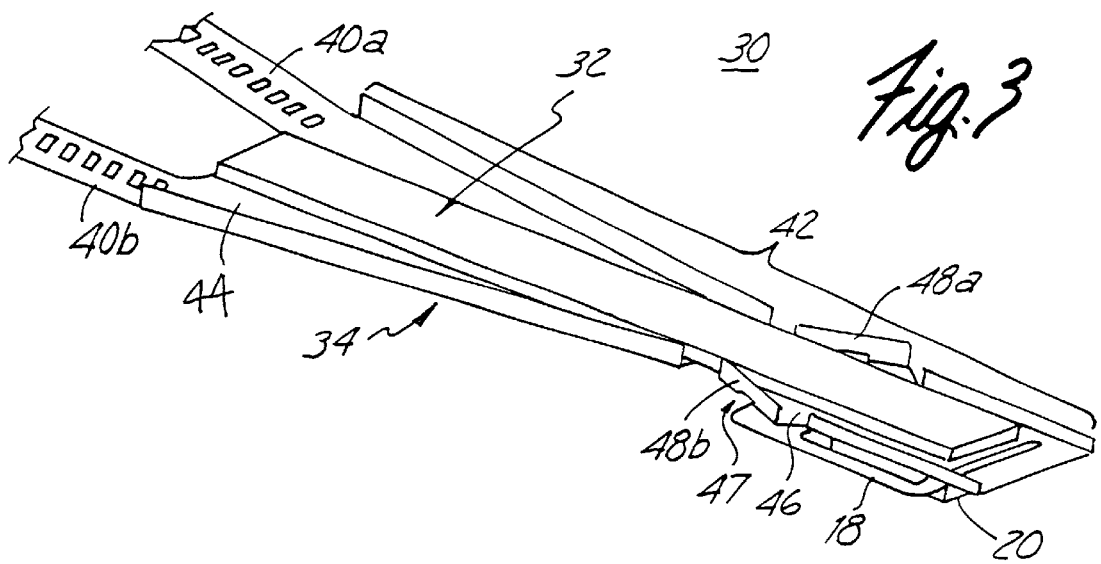
FIG. 3 is a top perspective view of the microactuation system of FIG. 2A.

FIG. 3 shows a top perspective view of the microactuation system 30 of the present invention (absent the mounting region 38). As shown in FIG. 3, moving from left to right, or from a proximal end to a distal end, the load beam 34 includes two pre-load bend legs 40a, 40b and a head suspension 42. The head suspension 42 is flexibly coupled to the mounting region 38 (shown in FIGS. 2A–2C) by the two pre-load bend legs 40a, 40b. The head suspension 42 includes a proximal section 44 and a distal section 46 separated by an air gap or a space 47. The distal section 46 is connected to the proximal section 44 by two hinges 48a and 48b. The distal section 46 of the head suspension 42 supports the flexure 18, which supports the slider 20, which supports the transducing head (not shown).

As further shown in FIG. 3, the bending motor 32 is mounted to a top surface of the head suspension 42 in a plane generally parallel to the plane of the head suspension 42. The bending motor 32 is mounted to the proximal section 44 and the distal section 46 of the head suspension 42. In a preferred embodiment, the bending motor 32 is mounted to the head suspension 42 using an adhesive. The bending motor 32 can also be mechanically fastened to the head suspension 42. The fastening of the bending motor 32 to the head suspension 42 is described in greater detail below with reference to FIG. 5.

The configuration of the bending motor 32 with respect to the head suspension 42 has significant advantages. The configuration allows for the use of longer bending motors 32, which allows for a greater stroke or cross-track deflection of the transducing head. Also, the bending motor 32 is supported by the head suspension 42 and the head suspension 42 acts to absorb the majority of shock loads applied to the slider 20 so that less force is transmitted through the bending motor 32. This results in improved robustness and shock resistance. Also, the configuration of the present invention results in a stiffer structure, which increases the resonance frequencies. Finally, the placement of the bending motor 32 near the slider 20 and the transducing head results in decreased in-loop resonances and vibrations as there are fewer components between the bending motor 32 and the transducing head (which supplies the position error information). The significance of in-loop resonances is further detailed in the above-referenced copending U.S. patent application Ser. No. 09/553,220, by Boutaghou, Crane, Mangold, and Walter et al. entitled "BENDING MICRO-ACTUATOR HAVING A TWO-PIECE SUSPENSION DESIGN."

Figure 4:
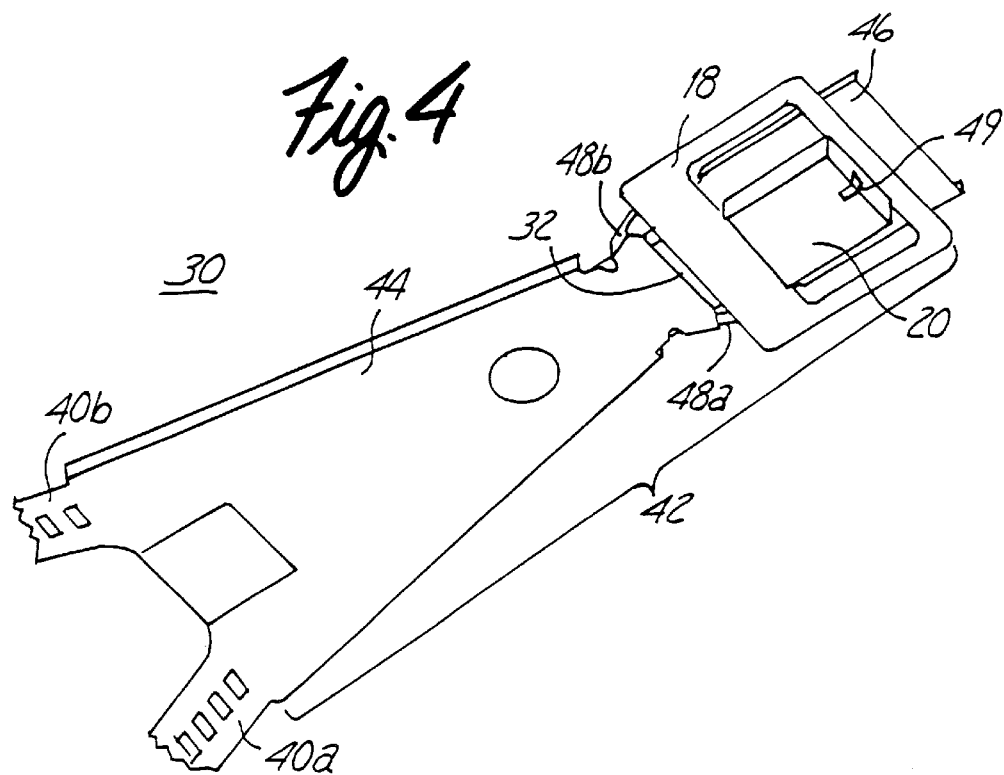
FIG. 4 is a bottom perspective view of the microactuation system of FIG. 2A.

A bottom perspective view of the microactuation system 30 of the present invention is shown in FIG. 4, which more clearly illustrates the flexure 18 and the slider 20 mounted to a distal end of the head suspension 42. FIG. 4 also shows the location of the transducing head 49 carried by the slider 20.

Figure 5:
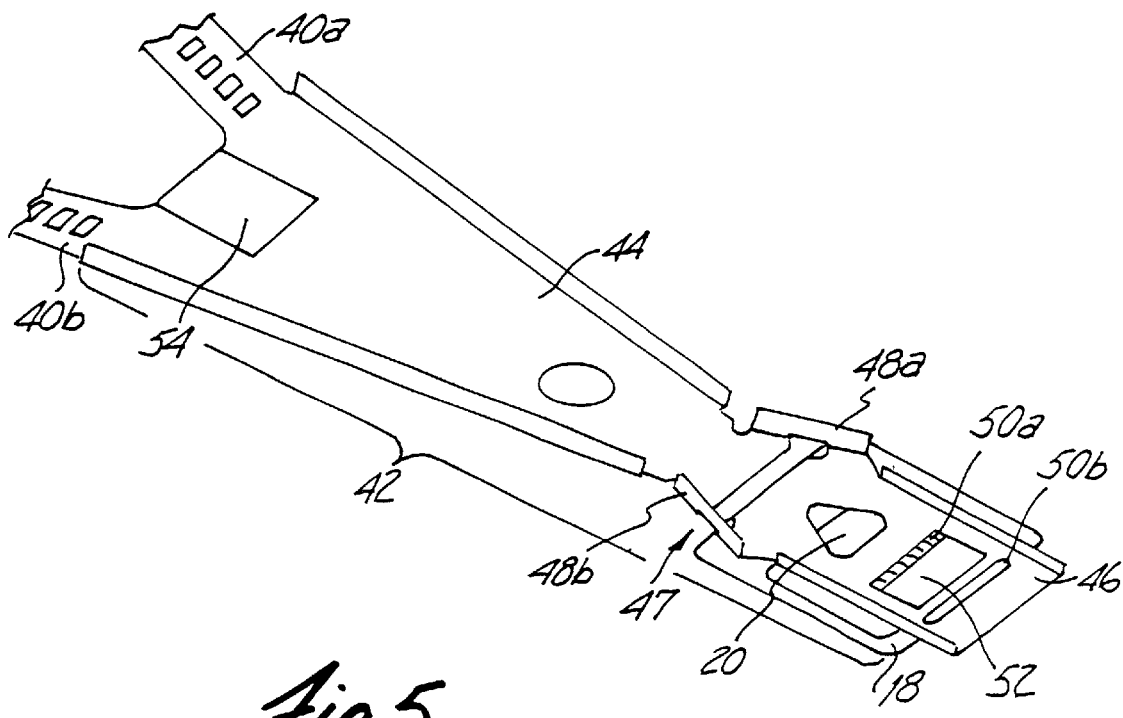
FIG. 5 is a top perspective view of the microactuation system of FIG. 2A shown with the bending motor removed.

FIG. 5 shows a top perspective view of the microactuation system 30 of the present invention with the bending motor 32 removed to reveal additional features of the head suspension 42. As further shown in FIG. 5, the distal section 46 of the head suspension 42 includes two slots 50a, 50b and an adhesive region 52, and the proximal section 44 includes, near a proximal end, an adhesive region 54. The bending motor 32 is generally mounted to the proximal section 44 of the head suspension 42 at the adhesive region 54 and to the distal section 46 of the head suspension 42 at the adhesive region 52. The slots 50a and 50b act to prevent the adhesive used to mount the bending motor 32 to the distal section 46 of the head suspension 42 from moving or wicking along the bending motor 32. This, in turn, helps to maximize the effective length, or the area between attachment points, of the bending motor 32. The present invention, by employing elements having increased effective lengths, has increased stroke or cross-track deflection of the transducing head.

Figure 6:
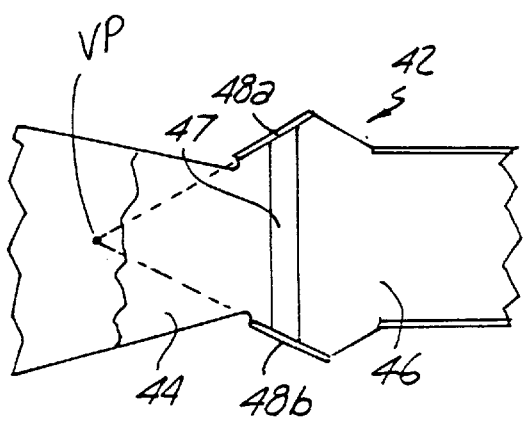
FIG. 6 is a top view of a portion of the microactuation system of FIG. 2A.

FIG. 6 shows a top view of the hinge region of the head suspension 42. As shown in FIG. 3, the proximal section 44 is rotatably coupled to the distal section 46 of the load beam 42 by hinges 48a and 48b. The hinges 48a and 48b are generally formed by bending the material of the head suspension 42 normal to the general plane of the head suspension 42. This configuration provides increased compliance for rotation about a virtual pivot VP to facilitate rotation and displacement of the distal section 46 with respect to the proximal section 44 in a plane generally parallel to that of the disc 22. At the same time, this configuration provides substantial stiffness to resist undesired movements and vibrations out of a plane generally parallel to the disc 22. The location of the virtual pivot VP is generally identified by the intersection of two lines extending from and parallel to the two hinges 48a, 48b (as shown by the dashed lines in FIG. 3). In a preferred embodiment, the hinges 48a, 48b are configured such that the virtual pivot VP is located near a longitudinal and transverse center point of the bending motor 32. One advantage of the configuration of the head suspension 42 is that the location of the two hinges 48a, 48b reduces deformation resulting from application of the preload force. Because the hinges 48a, 48b are located close to the point of application of the preload force, lower bending moments result.

The specific pivotal structures flexibly coupling the distal portion 46 of the head suspension 42 to the proximal portion 44 of the head suspension 42 shown in FIGS. 3–6 are intended to be exemplary only. Many other pivotal structures can also be used between the distal portion 46 and proximal portion 44 of the head suspension 42. For example, the hinges 48a, 48b can be disposed at a variety of angles with respect to the longitudinal centerline of the head suspension 42. Also, one or more appropriately sized beams can be used to connect the two portions 44, 46 of the head suspension 42. Other structures generally known to those of ordinary skill in the art can also be employed.

The bending motor 32 is a structural element operable as a bendable cantilever to alter the position of the distal section 46 with respect to the proximal section 44 of the head suspension 42 (as illustrated by the sequence of FIGS. 2A–2C). By causing rotation and displacement of the distal section 46 of the head suspension 42, the bending motor 32 effects high resolution positioning of the transducing head carried by the slider 20. In a preferred embodiment the bending motor 32 is constructed from an electroactive material such as piezoelectrics, electroactive ceramics, electroactive polymers, or electrostrictive ceramics. In another preferred embodiment the bending motor 32 is constructed from thermoactive elements. The remainder of this disclosure will describe the preferred embodiment of the present invention employing piezoelectric elements such as zinc oxide (ZnO), lead zirconate titanate ($PbZrTiO_3$, also known as PZT), aluminum nitride (AlN), or polyvinylidene fluoride (PVDF).

Figure 7A:
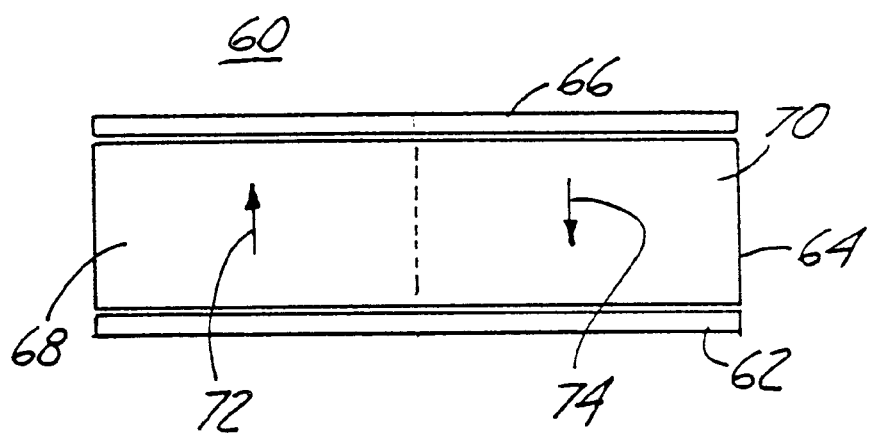
FIG. 7A is a cross-sectional view of a bending motor according to a first embodiment of the present invention.

FIG. 7A shows a sectional view of a oppositely poled bending motor 60, which represents a first preferred embodiment of the bending motor 32 described with reference to FIG. 3. The view shown in FIG. 7A is a transverse cross-section taken across the width of the oppositely poled bending motor 60. The oppositely poled bending motor 60 operates using a "single-ended" approach as further explained below. The oppositely poled bending motor 60 includes a bottom electrode 62, a oppositely poled piezoelectric element 64, and a top electrode 66. The oppositely poled piezoelectric element 64 is divided generally along a longitudinal centerline into a first portion 68 (shown on the left side of FIG. 7A) and a second portion 70 (shown on the right side of FIG. 7A). The oppositely poled piezoelectric element 64 is formed such that the first portion 68 and the second portion 70 have opposite poling. For example, the first portion 68 is poled in the direction of the arrow 72, and the second portion 70 is poled in the direction of the arrow 74.

During operation, an electric potential is applied to the bottom electrode 62 and the top electrode 66. Generally, the bottom electrode 62 is connected to electrical ground, and the driving voltage is applied to the top electrode 66. Alternatively, voltages of opposite polarities can be applied to the top electrode 66 and the bottom electrode 62 to create an overall potential between the electrodes greater than the voltage applied to either single electrode. The potential difference between the bottom electrode 62 and the top electrode 66 causes expansion or contraction of the first portion 68 and the second portion 70 of the oppositely poled piezoelectric element 64. For example, if a positive voltage is applied to the top electrode 66, the first portion 68 (poled in a positive direction) will contract in the direction normal to the electrodes 62, 66, which, in turn, will cause the first portion 68 to expand longitudinally (in the direction parallel to the electrodes 62, 66). Conversely, the same positive voltage applied to the top electrode 66 will cause the second portion 70 to contract longitudinally.

The expansion of the first portion 68 and the concurrent contraction of the second portion 70 generates a bending moment in the piezoelectric element 64 in-plane. This moment results in a bending motion of the oppositely poled bending motor 60, toward the right as illustrated in FIG. 2C, which will effect rotation and displacement of the distal section 46 with respect to the proximal section 44 of the head suspension 42. This rotation and displacement of the distal section 46 will, in turn, cause movement of the transducing head carried by the slider 20. The amount of bending of the oppositely poled bending motor 60, and thus the amount of displacement of the transducing head, is precisely controlled by the magnitude of the voltages applied to the electrodes 62, 66. The direction of the bending motion is controlled by the polarity of the voltage applied to the electrodes 62, 66, and the amount of displacement is controlled by the magnitude of the voltages applied. The bending motion will occur in a direction toward the side that is contracting longitudinally.

Figure 7B:
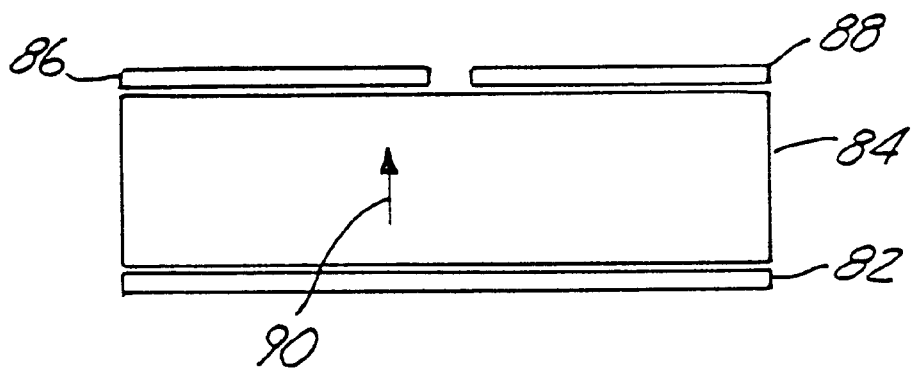
FIG. 7B is a cross-sectional view of a bending motor according to a second embodiment of the present invention.

FIG. 7B shows a sectional view of a uniformly poled bending motor 80, which represents a second preferred embodiment of the bending motor 32 described with reference to FIG. 3. The view shown in FIG. 7B is a transverse cross-section taken across the width of the uniformly poled bending motor 80. The uniformly poled bending motor 80 operates using a "differential" approach as further explained below. The uniformly poled bending motor 80 includes a bottom electrode 82, a piezoelectric element 84, a first top electrode 86, and a second top electrode 88. The first top electrode 86 is deposited over the top surface of one longitudinal half of the piezoelectric element 84, and the second top electrode 88 is placed over the other longitudinal half of the piezoelectric element 84. The entire piezoelectric element 84 is poled in the direction of the arrow 90.

During operation, an electric potential is applied to the bottom electrode 82 and the top electrodes 86, 88. Generally, the bottom electrode 82 is connected to electrical ground, and the driving voltage is applied to the top electrodes 86, 88. Alternatively, two bottom electrodes can be used, placed generally opposite the two top electrodes 86, 88, and a voltage can also be applied to the two bottom electrodes. The potential difference between the bottom electrode 82 and the top electrodes 86, 88 causes expansion or contraction of the portion of the piezoelectric element 84 located between the respective top electrode and the bottom electrode. For example, if a positive voltage is applied to the first top electrode 86, the portion of the piezoelectric element 84 located between the first top electrode 86 and the bottom electrode 82 will contract in the direction normal to the electrodes 82, 86, which, in turn, will cause the that portion to expand longitudinally (in the direction parallel to the electrodes 82, 86). At the same time, a negative voltage is applied to the second top electrode 88, which causes the portion of the piezoelectric element located between the second top electrode 88 and the bottom electrode 82 to contract longitudinally.

The expansion of the first portion and the concurrent contraction of the second portion generates a bending moment in the piezoelectric element 84. This moment results in a bending motion of the uniformly poled bending motor 80, toward the right as illustrated in FIG. 2C, which will effect rotation and displacement of the distal section 46 with respect to the proximal section 44 of the head suspension 42. This rotation and displacement of the distal section 46 will, in turn, cause movement of the transducing head carried by the slider 20. The amount of bending of the uniformly poled bending motor 80, and thus the amount of displacement of the transducing head, is precisely controlled by the magnitude of the voltages applied to the electrodes 82, 86, 88. The direction of the bending motion is controlled by the polarity of the voltages applied to the first top electrode 86 and the second top electrode 88, and the amount of displacement is controlled by the magnitude of the voltage applied. The bending motion will occur in a direction toward the side that is contracting longitudinally.

Although the present invention has been described with reference to preferred embodiments, workers skilled in the art will recognize that changes may be made in form and detail without departing from the spirit and scope of the invention.

What is claimed is:

1. A microactuator for selectively altering a position of a transducing head carried by a slider in a disc drive system with respect to a track of a rotatable disc having a plurality of concentric tracks, the disc drive system having an actuator arm, the microactuator comprising:
    a load beam attached to a distal end of the actuator arm, the load beam having a proximal section and a distal section;
    flexure connected to the distal section of the load beam for supporting the slider carrying the transducing head;
    a hinge attached between the proximal section and the distal section, the hinge being flexible to permit movement of the distal section with respect to the proximal section in the general plane of the load beam; and
    a bending motor connected between the proximal section and a distal end of the distal section of the load beam disposed generally along a longitudinal centerline of the load beam, the bending motor being deformable in response to an applied control signal.

2. The microactuator of claim 1, wherein the hinge includes a first hinge element and a second hinge element attached between the proximal section and the distal section, the first and second hinge elements being flexible to permit movement of the distal section with respect to the proximal section in the general plane of the load beam.

3. The microactuator of claim 2, wherein the first and second hinge elements are bent normal to the general plane of the load beam to increase vertical stiffness and decrease lateral stiffness.

4. The microactuator of claim 1, wherein the bending motor comprises:
    a bottom electrode;
    an electroactive material on top of the bottom electrode, the electroactive material constructed such that it has two portions poled in opposite directions; and
    a top electrode on top of the electroactive material;
    wherein the electroactive material bends in-plane in response to control signals supplied to the bottom electrode and the top electrode.

5. The microactuator of claim 4, wherein the electroactive material is constructed from a member of the group consisting of a piezoelectric material, an electroactive ceramic, an electroactive polymer, and an electrostrictive ceramic material.

6. The microactuator of claim 1, wherein the bending motor comprises:
    a bottom electrode;
    an electroactive material on top of the bottom electrode;
    a first top electrode disposed on top of a first longitudinal half of the electroactive material; and
    a second top electrode disposed on top of a second longitudinal half of the electroactive material;
    wherein the electroactive material bends in-plane in response to control signals supplied to the bottom electrode and the top electrode.

7. The microactuator of claim 6 wherein the electroactive material is constructed from a member of the group consisting of a piezoelectric material, an electroactive ceramic, an electroactive polymer, and an electrostrictive ceramic material.

8. A disc drive suspension comprising:
    an actuator arm having a proximal end and a distal end;
    a load beam attached to the distal end of the actuator arm, the load beam having a mounting region at a proximal end, a head suspension near a distal end, and a flexible region between the mounting region and the head suspension;
    the head suspension having a proximal section and a distal section separated by a gap;
    a flexure connected to the distal section of the head suspension, the flexure configured to receive and support a transducing head;
    the head suspension having a first hinge attached between the proximal section and the distal section, the first hinge being flexible to permit movement of the distal section with respect to the proximal section in the general plane of the head suspension; and
    a bending motor attached at a first end to the proximal section of the head suspension and at a second end to a distal end of the distal section of the head suspension, the bending motor being deformable in response to an applied control signal.

9. The disc drive suspension of claim 8, further comprising a second hinge attached between the proximal section and the distal section, the second hinge being flexible to permit movement of the distal section with respect to the proximal section in the general plane of the load beam.

10. The disc drive suspension of claim 9, wherein the first and second hinges are bent normal to the general plane of the load beam to increase vertical stiffness and decrease lateral stiffness.

11. The disc drive suspension of claim 8, wherein the bending motor comprises:
 a bottom electrode;
 an electroactive material on top of the bottom electrode, the electroactive material constructed such that it has two portions poled in opposite directions; and
 a top electrode on top of the electroactive material;
 wherein the electroactive material bends in-plane in response to control signals supplied to the bottom electrode and the top electrode.

12. The disc drive suspension of claim 11 wherein the electroactive material is constructed from a member of the group consisting of a piezoelectric material, an electroactive ceramic, an electroactive polymer, and an electrostrictive ceramic material.

13. The disc drive suspension of claim 8 wherein the bending motor comprises:
 a bottom electrode;
 an electroactive material on top of the bottom electrode;
 a first top electrode disposed on top of a first longitudinal half of the electroactive material; and
 a second top electrode disposed on top of a second longitudinal half of the electroactive material;
 wherein the electroactive material bends in plane in response to control signals supplied to the bottom electrode and the top electrode.

14. The disc drive suspension of claim 13 wherein the electroactive material is constructed from a member of the group consisting of a piezoelectric material, an electroactive ceramic, an electroactive polymer, and an electrostrictive ceramic material.

15. The disc drive suspension of claim 8 wherein the edges of the distal section of the head suspension are bent normal to the plane of the head suspension to provide increased out of plane stiffness.

16. The disc drive suspension of claim 8 wherein the distal section of the head suspension includes a first notch and a second notch, distal to the first notch, for preventing wicking of an adhesive used to bond the bending motor to the distal section.

17. A microactuator for selectively altering a position of a transducing head carried by a slider in a disc drive system with respect to a track of a rotatable disc having a plurality of concentric tracks, the disc drive system having an actuator arm, the microactuator comprising:

a load beam attached to a distal end of the actuator arm, the load beam having a proximal section and a distal section;

a flexure connected to the distal section of the load beam for supporting the slider carrying the transducing head;

a hinge including a first hinge element and a second hinge element attached between the proximal section and the distal section, the first and second hinge elements being flexible to permit movement of the distal section with respect to the proximal section in the general plane of the load beam, the first and second hinge elements being bent normal to the general plane of the load beam to increase vertical stiffness and decrease lateral stiffness;

a bending motor connected between the proximal section and the distal section of the load beam disposed generally along a longitudinal centerline of the load beam, the bending motor being deformable in response to an applied control signal; and the first and second hinge elements being disposed at equal and opposite angles with respect to a longitudinal centerline of the load beam such that lines extending from the first and second hinge elements intersect at or near a longitudinal midpoint of the bending motor.

18. A disc drive suspension comprising:

an actuator arm having a proximal end and a distal end;

a load beam attached to the distal end of the actuator arm, the load beam having a mounting region at a proximal end, a head suspension near a distal end, and a flexible region between the mounting region and the head suspension;

the head suspension having a proximal section and a distal section separated by a gap;

a flexure connected to the distal section of the head suspension, the flexure configured to receive and support a transducing head;

the head suspension having a first hinge and a second hinge attached between the proximal section and the distal section, the first and second hinges being flexible to permit movement of the distal section with respect to the proximal section in the general plane of the head suspension, the first and second hinges being bent normal to the general plane of the load beam to increase vertical stiffness and decrease lateral stiffness;

a bending motor attached at a first end to the proximal section of the head suspension and at a second end to the distal section of the head suspension, the bending motor being deformable in response to an applied control signal; and the first and second hinges being disposed at equal and opposite angles with respect to a longitudinal centerline of the load beam such that lines extending from the first and second hinges intersect at or near a longitudinal midpoint of the bending motor.

* * * * *

UNITED STATES PATENT AND TRADEMARK OFFICE
CERTIFICATE OF CORRECTION

PATENT NO. : 6,680,825 B1
DATED : January 20, 2004
INVENTOR(S) : James Morgan Murphy et al.

It is certified that error appears in the above-identified patent and that said Letters Patent is hereby corrected as shown below:

Column 7,
Line 60, after "a" insert -- head suspension with a --.
Line 62, insert -- a -- before "flexure", delete "load beam", insert -- head suspension --.

Column 8,
Line 1, delete "between", insert -- from a proximal end of the --.
Line 2, delete "and", insert -- to --, delete "of the load beam", insert -- and --.
Line 5, -- head suspension with a -- has been inserted before "proximal".
Line 6, "load beam" has been changed to -- head suspension --.
Line 11, "between" has been changed to -- from a proximal end of the --.
Line 11, "and" has been changed to -- to --.
Line 12, "of the load beam" has been changed to -- and --.
Line 66, after "to", insert -- a proximal end of --.

Column 9,
Line 13, -- a proximal end of -- has been inserted before "the proximal section".

Signed and Sealed this

Thirteenth Day of December, 2005

JON W. DUDAS
*Director of the United States Patent and Trademark Office*